United States Patent [19]

Zweifel

[11] Patent Number: 4,947,165

[45] Date of Patent: Aug. 7, 1990

[54] WINDSHEAR DETECTION FOR AIRCRAFT USING TEMPERATURE LAPSE RATE

[76] Inventor: Terry L. Zweifel, 7250 N. 30th Dr., Phoenix, Ariz. 85023

[21] Appl. No.: 410,038

[22] Filed: Sep. 20, 1989

Related U.S. Application Data

[63] Continuation of Ser. No. 103,486, Sep. 30, 1987, abandoned.

[51] Int. Cl.$^5$ ............................................. G08B 23/00
[52] U.S. Cl. .................................... 340/968; 244/181; 340/963; 364/434
[58] Field of Search ....................... 340/963, 968, 962; 364/427, 428, 433, 434, 424.01; 73/178 R, 178 T; 244/181, 182; 374/102, 103, 136, 141, 210

[56] References Cited

U.S. PATENT DOCUMENTS

| | | | |
|---|---|---|---|
| 3,427,581 | 2/1969 | Hartman | 340/968 |
| 3,618,002 | 11/1971 | Stinson | 340/968 |
| 3,935,460 | 1/1976 | Flint | 374/112 |
| 4,282,753 | 8/1981 | Davidson | 374/166 |
| 4,318,076 | 3/1982 | Whitfield | 73/178 T |
| 4,586,140 | 4/1986 | Millen | 73/178 T |
| 4,589,070 | 5/1986 | Kyrazis | 340/968 |
| 4,593,285 | 6/1986 | Miller et al. | 340/968 |
| 4,725,811 | 2/1988 | Muller et al. | 340/968 |
| 4,728,951 | 3/1988 | Johnson et al. | 340/968 |

FOREIGN PATENT DOCUMENTS

0125087 11/1984 European Pat. Off. .
8807734 6/1988 World Int. Prop. O. .

OTHER PUBLICATIONS

The Crash of Delta Flight 191 at Dallas–Fort Worth International Airport on 2 Aug. 1985: Multiscale Analysis of Weather Conditions, NOAA Technical Report ERL 430-ESG 2, Dec. 1986.

Primary Examiner—Joseph A. Orsino
Assistant Examiner—Brent A. Swarthout
Attorney, Agent, or Firm—Robert A. Pajak

[57] ABSTRACT

An apparatus for measuring the temperature lapse rate of the environment surrounding an aircraft in flight is described. The measured temperature lapse rate is compared with the dry adiabatic temperature lapse rate. If the measured temperature lapse rate is less than the dry adiabatic temperature lapse rate, a cautionary message is issued to the flight crew alerting them of the probability of microburst windshears. In addition, if the cautionary message has been issued and a rapid reversal of the measured temperature lapse rate occurs, a warning message is issued to the flight crew advising them of the probable penetration of a microburst windshear.

3 Claims, 5 Drawing Sheets

WINDSHEAR DETECTION FOR AIRCRAFT USING TEMPERATURE LAPSE RATE

BACKGROUND OF THE INVENTION

The present invention relates generally to the detection of hazardous windshear phenomena and more specifically to the detection and alerting of the flight crew of aircraft of windshear conditions.

Windshear is a weather condition which results in rapidly changing wind velocity and direction. In terms of aircraft flight performance, windshear is, of course, most dangerous during takeoffs and landing approaches. Of the numerous causes of windshear, the microburst has been identified as the most hazardous to aircraft flight. Aircraft accidents have been attributed to microburst.

Microburst consists of a rapidly descending column of air that, when striking the ground, spreads out in a fan-like fashion As the air spreads out from the center of the ground impact area, serious changes in wind occur which can adversely affect an aircraft's ability to remain aloft. Hence, an aircraft may experience a descent toward the ground due to the down-flowing air mass and also a loss in airspeed as it encounters a rapidly changing tailwind due to the outflow.

In the prior art, windshear detection systems have been constructed to detect the presence of windshear by using combinations of ground speed, vertical and horizontal accelerations, airspeed, and other measurements. Such a windshear system is illustrated in U.S. Pat. No. 4,593,285, entitled "Windshear Detection and warning System with Evasion Command", issued June 3, 1986 to H. Miller, et al. This patent is incorporated herein by reference. A deficiency of the disclosed system is that the windshear must be encountered before a warning is given to the flight crew. That is, the systems are reactive in nature. In addition, such systems are unaware of the general atmospheric conditions surrounding the aircraft.

Recent studies have indicated a high correlation between certain atmosphere conditions and the presence of a microburst. Most notable of these has been the correlation between temperature lapse rate and microbursts as described in "The Crash of Delta Flight 191 at Dallas-Fort Worth International Airport on 2 Aug. 1985: Multiscale Analysis of Weather Conditions", NOAA Technical Report ERL-430-ESG 2, F. Caracena et al, Dec. 1986. This last mentioned publication is incorporated herein by reference. Temperature lapse rate is the measurement of the change in ambient temperature with altitude. The just referred to publication describes an aircraft accident attributed to microburst.

By measuring the temperature lapse rate with suitable filtering to eliminate unwanted noise and comparing the computed temperature lapse rate to a value commensurate with unstable air, known as the dry adiabatic temperature lapse rate, it is possible to warn the flight crew of the high probability of microbursts considerably before prior art systems. Hence, it is possible for the flight crew to be warned and thus avoid a microburst condition without the necessity of penetration into the microburst required by prior art warning systems.

SUMMARY OF THE INVENTION

An on-board aircraft system is described that provides an indication of windshear probability considerably before prior art systems. A measurement of temperature change with altitude (temperature lapse rate) is made, filtered to eliminate noise, and compared to the dry adiabatic temperature lapse rate, the latter being indicative of unstable air. When the measured or empirical temperature lapse rate is less than the dry adiabatic temperature lapse rate for a predetermined number of measurements, a cautionary message is relayed to the flight crew of the aircraft via a caution light. The same cautionary message may be transmitted to the landing airport to be used to caution other aircraft and may also be used to enhance the detection capability of existing on-board prior art systems.

If a cautionary message has been generated and the aircraft enters a region of rapidly decreasing temperature as is usually present in the downflow of a microburst, a warning message is generated alerting the flight crew to take immediate action to exit the condition. The warning message may also be transmitted to the landing airport via normal radio communication links and used to warn other aircraft in the immediate vicinity and/or used to enhance the detection capability of existing on-board prior art systems.

DESCRIPTION OF THE PREFERRED EMBODIMENTS

Figure 1:
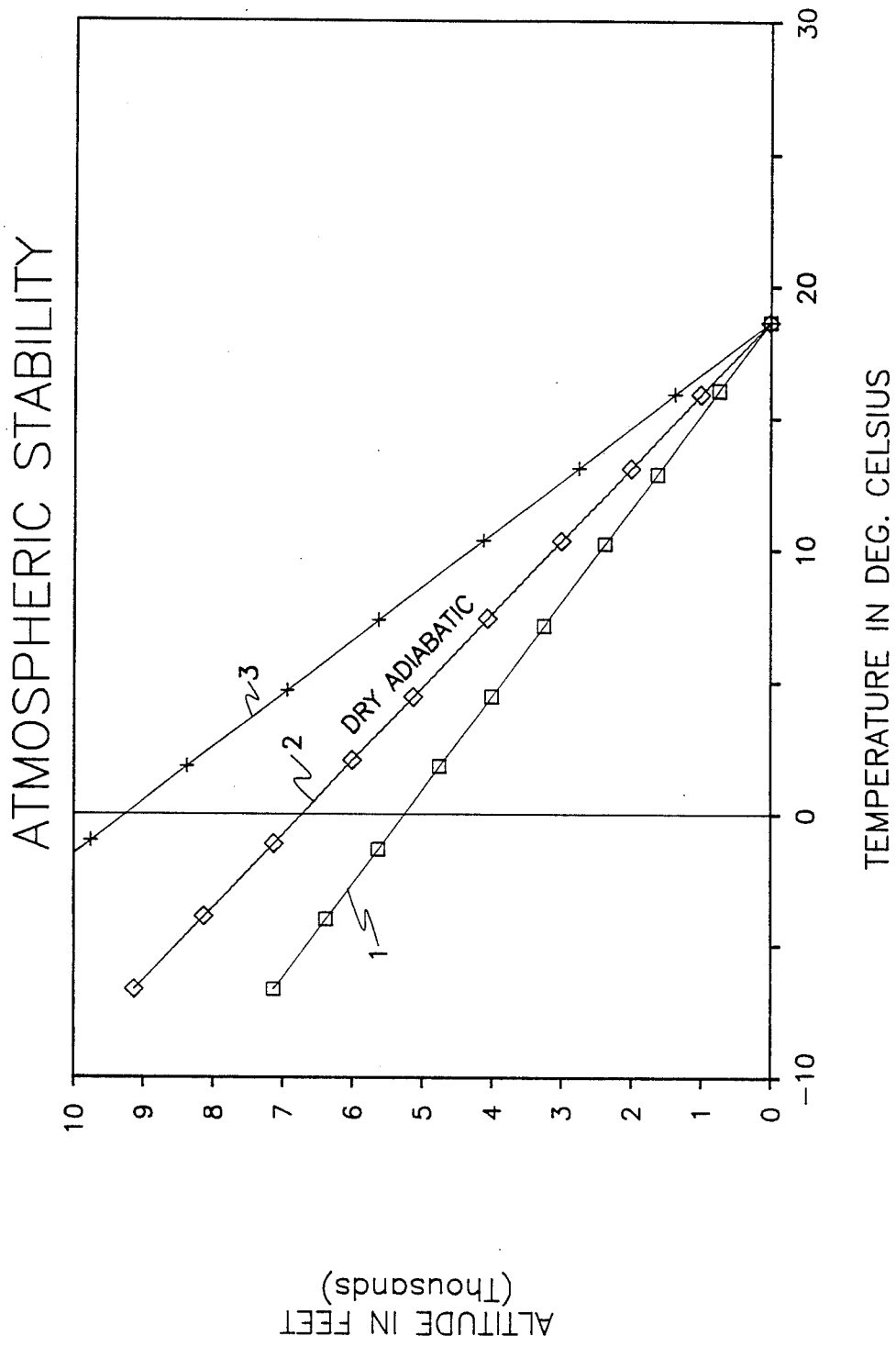
FIG. 1 is a graph illustrating the effect of temperature lapse rates on a small quantity of air.

FIG. 1 illustrates the effect of temperature change with altitude, known as temperature lapse rate, on a small parcel of warm, dry air. If the air parcel enters a region with a temperature lapse rate less than (i.e., the temperature decreases with altitude faster) that for dry adiabatic air, it will initially ascend since its temperature is greater than the air surrounding it. As it rises, it will be cooled adiabatically; that is, it will neither receive nor give heat to the surrounding environment, but will cool by expanding its volume. Consequently, it will, at any given altitude, be warmer than the surrounding air, and will therefore continue to rise. The environment is said to be "unstable" when this condition occurs; that is, air entering the environment will continue to rise indefinitely since it will always be warmer than the surrounding air which is cooling much more quickly with altitude.

FIG. 1 is a graph of temperature versus altitude that illustrates the above phenomenon. Line segment 1 illustrates the change in temperature with altitude for an environment whose temperature lapse rate is less than the dry adiabatic temperature lapse rate of −0.003 degrees C. per foot. Line segment 2 illustrates the temperature change of a small parcel of warm, dry air versus altitude. As can be seen, at any selected altitude above the ground, the temperature of the air parcel is greater than the environmental air surrounding it. Consequently, the air parcel will continue to rise since its density is less than that of the surrounding air. In fact, the air parcel will continue to rise until the temperature of the surrounding air is equal to its temperature. This would, of course, require that the temperature lapse rate of the environment change. For comparison purposes, line segment 3 illustrates a temperature lapse rate which is greater than dry adiabatic. In this case, a warm, dry parcel of air would not rise since its surrounding environment at any selected altitude would be warmer than the parcel. This situation, which is much more common than the case where the temperature lapse rate is less than dry adiabatic, is referred to as a "stable" atmosphere.

Numerous parcels of air rising in a unstable atmosphere will continue to rise until their temperatures are sufficiently low to cause any water vapor within the parcels to condense, perhaps forming rain droplets and thunderstorm clouds. As the air parcels have risen, they have, of course, gained potential energy. For reasons that are not yet clearly understood, occasionally this potential energy is rapidly converted into kinetic energy as the parcels accelerate toward the earth. This rapid acceleration, which can result in speeds exceeding 50 miles per hour, can generate a phenomenon known as a microburst, first described by Dr. T. Fujita of the University of Chicago.

Figure 2:
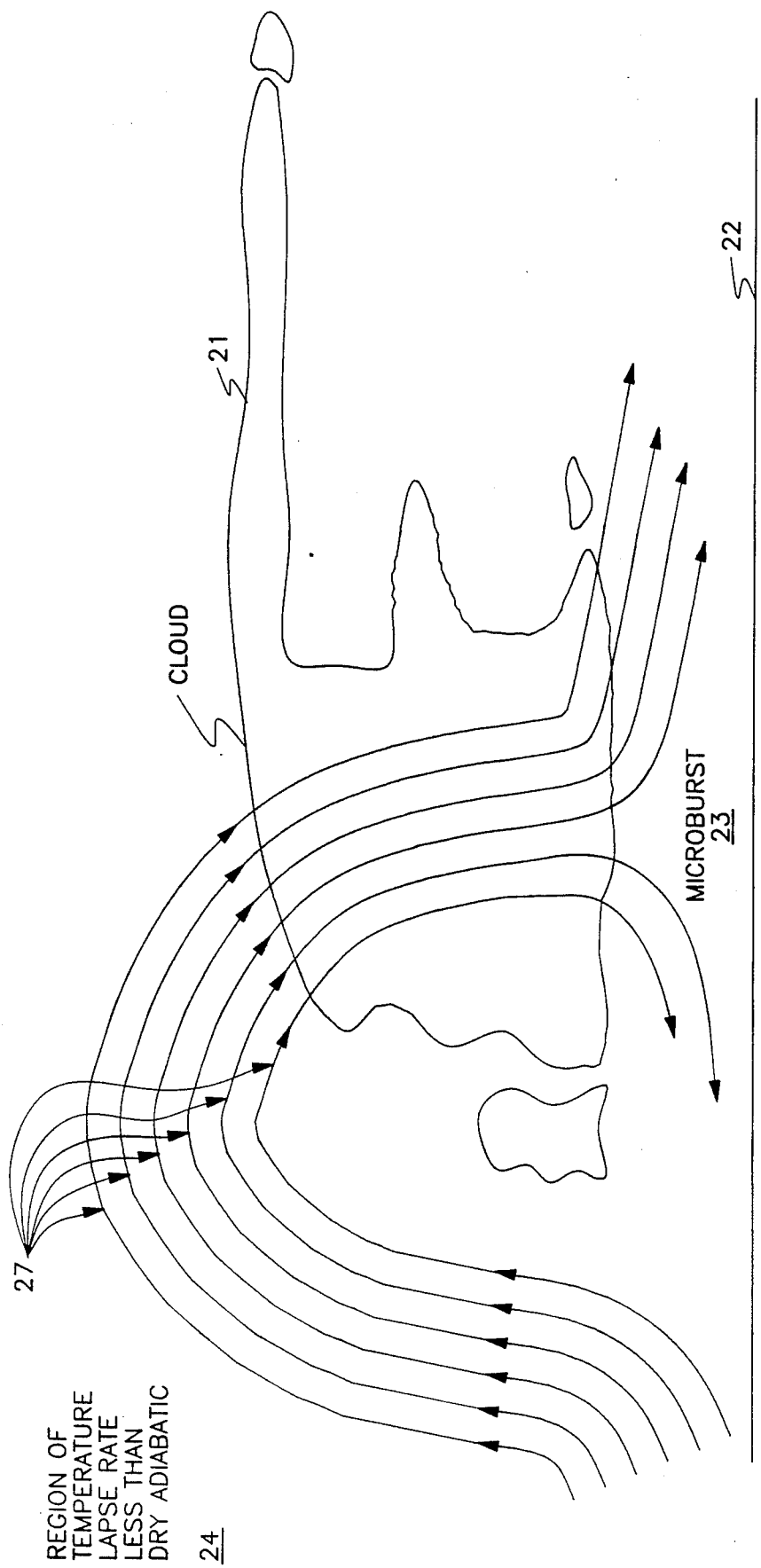
FIG. 2 is a graph illustrating the general atmospheric phenomenon surrounding the microburst windshear threat.

FIG. 2 illustrates the formation of a microburst according to the previous discussion. Parcels of warm, dry air enter an atmospheric region, 24, whose temperature lapse rate is less than dry adiabatic, consequently, the parcels of air begin to rise as shown by the lines indicated by the number 27. As the water vapor in the parcels condenses, clouds, 21, are formed, and, in some cases, the air parcels will begin accelerating along lines 27 toward the ground, 22, creating a microburst, 23. As the descending air strikes the ground, it will fan out uniformly. This condition is referred to as an "outflow". An aircraft attempting to fly in such a condition may experience both the downward force of the descending air parcels and a rapid loss of airspeed as it enters the outflow region since the air is moving rapidly away from the aircraft. Such conditions have resulted in several aircraft accidents taking numerous lives.

Figure 3:
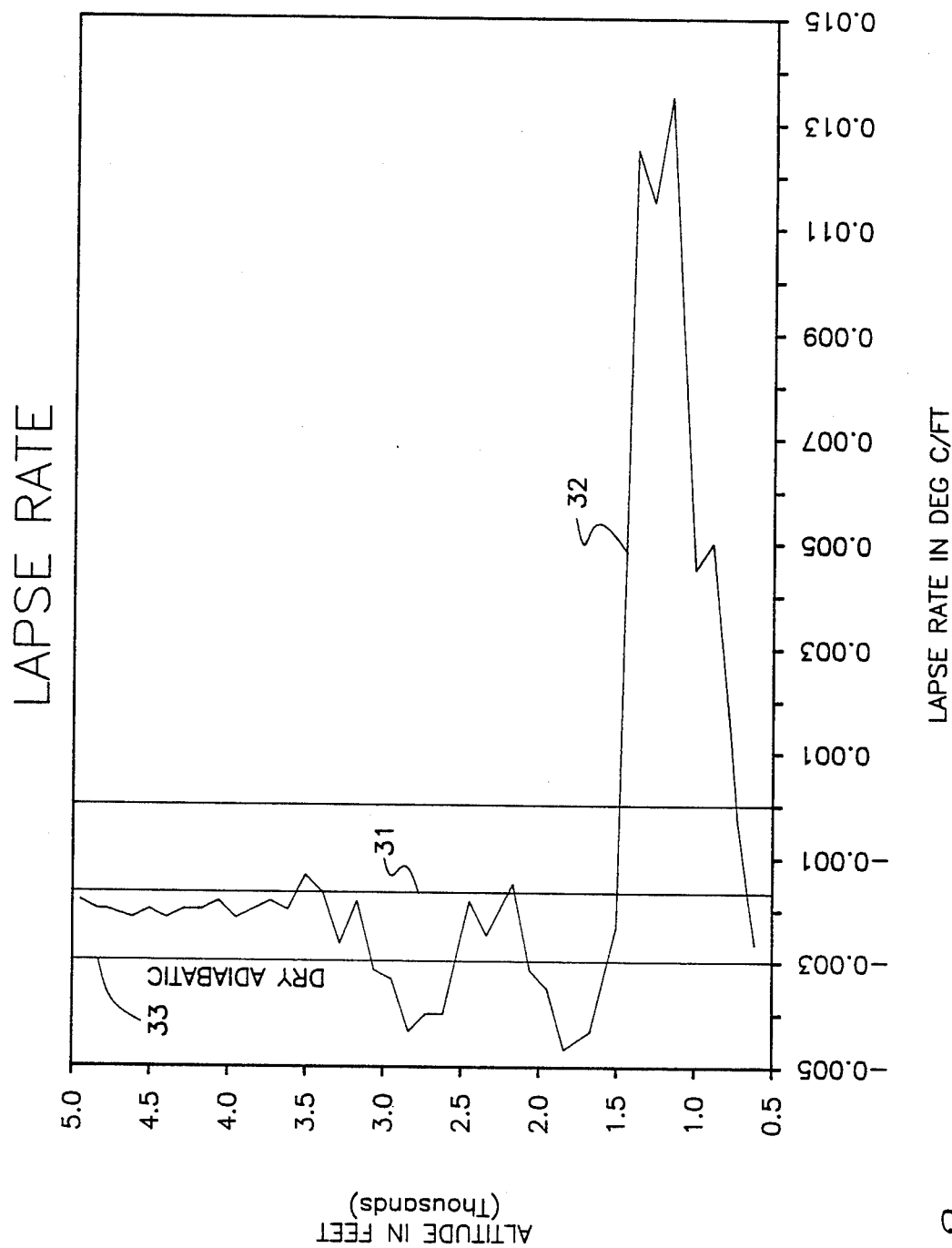
FIG. 3 is a graph comparing a stable temperature lapse rate with the temperature lapse rate measured during the accident of an L-1011 aircraft at the Dallas-Fort Worth International Airport on 2 August 1985.

It would follow from the above discussion that temperature lapse rate can be a good indicator of when potential microburst conditions exist. This conclusion is illustrated in FIG. 3. Line 31 illustrates the condition of a typical stable atmosphere wherein the temperature lapse rate is greater than the dry adiabatic temperature lapse rate, 33, of −0.003 degrees C. per foot of altitude. In this case, the probability of a microburst is very small. Line 32 illustrates the temperature lapse rate present during the L-1011 microburst accident disclosed in the above referred to NOAA report. As can be clearly seen, the temperature lapse rate is, in general, less than the dry adiabatic temperature lapse rate from about 3000 feet to 1500 feet. Furthermore, it will be noticed that line 32 rapidly becomes more positive below approximately 1500 feet, indicating that the region contains the cool outflow air from the microburst.

It is the purpose of the present invention to calculate the actual temperature lapse rate using on-board, existing aircraft instrumentation and use the information to caution and warn about the possibility of microbursts. The present invention may be implemented by using conventional analog circuitry and computation techniques or by using conventional digital techniques, or by a combination of conventional hybrid digital-analog techniques. For example, summing junctions and amplifiers may be implemented by operational amplifiers appropriately configured, while logic and mathematical functions may be implemented in a digital computer or the hardware equivalent. Since the functional units represented by the various blocks may be any one of the numerous devices for each respective function well known in the art, it is considered unnecessary to show circuit detail. For clarity and understanding of the invention, it will be explained by using a generally analog format, it being understood that the same analog format may also represent the programming of a programmable digital computer wherein the various analog inputs are converted to digital signals for digital processing.

Figure 4:
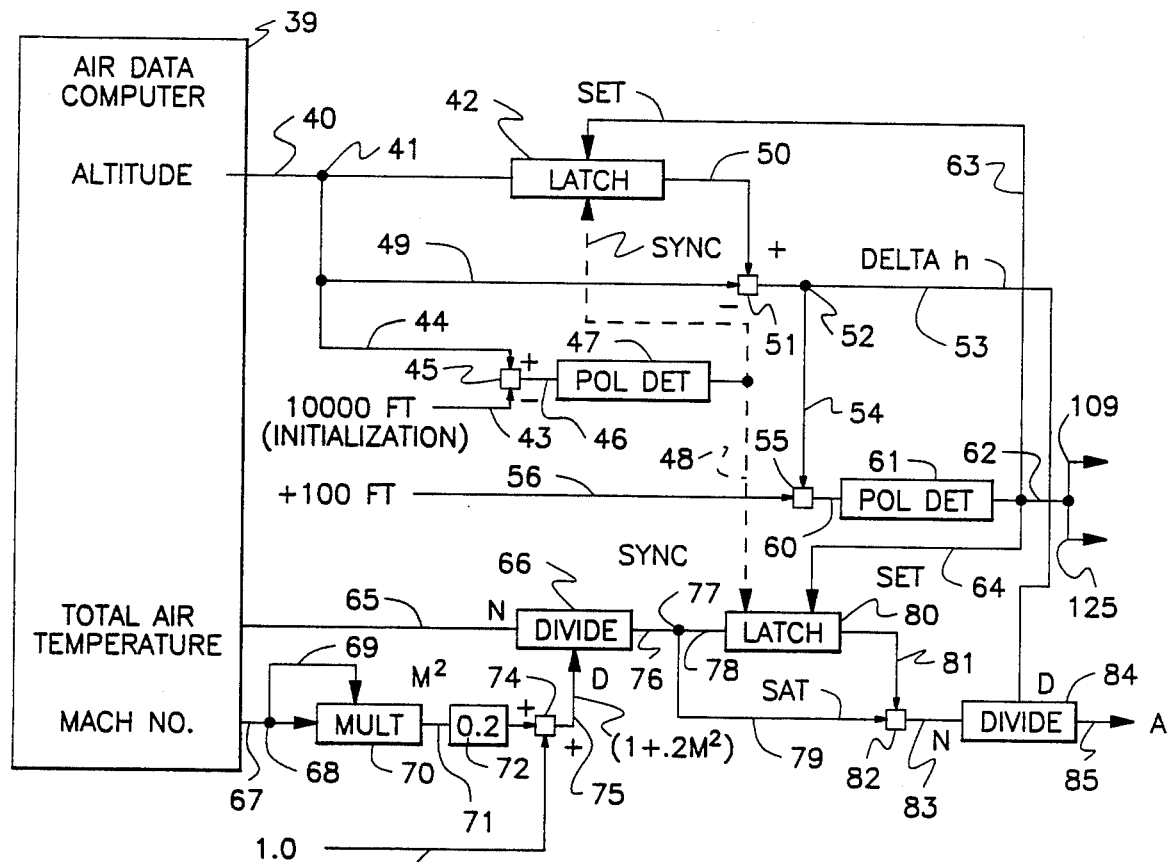
FIGS. 4 through 6 are illustrations, in block diagram form, of the present invention.

Referring now to FIG. 4, Conventional Air Data Computer 39 supplies a signal representing altitude to conventional latch 42 via lead 40 and junction 41. Simultaneously, the signal representing altitude appears on lead 44 and thence to conventional summation device 45. A signal representing a constant, initialization altitude, for example, 10,000 feet, appears on lead 43 and thence to summation device 45. Summation device 45 produces the algebraic sum of the signals on leads 44 and 43 on lead 46 and to conventional Polarity Detector 47. Polarity Detector 47 outputs a signal on lead 48 that is representative of the mathematical sign of the signal on lead 46. Lead 48 controls conventional latches 42 and 80. In this manner, if the current altitude of the aircraft is above the preselected altitude (10,000 feet for example), the sign of the signal on lead 46 will be positive and Polarity Detector 47 will output a logical zero on lead 48 and hence latches 42 and 80 will be in a synchronization mode; that is, the value on the output of the latch, leads 50 and 81 respectively, will be identical to the input, junction 41 and lead 78 respectively.

A signal representing a predetermined incremental altitude, for example, +100 feet, is present on lead 56 and is thus supplied to conventional summation device 55. Simultaneously, the signal representing altitude is supplied to conventional summation device 51 via lead 49, and the signal representing a value of altitude which has been stored by latch 42 is also supplied to summation device 51 via lead 50.

Summation device 51 produces the algebraic sum of the signals on leads 50 and 49 at junction 52. Junction 52 is representative of a delta altitude; that is, the difference between the current altitude and the stored altitude of the latch. The signal at junction 52 is supplied to summation device 55 via lead 54. Summation device 55 produces the algebraic sum of the signal on lead 56, the predetermined incremental altitude, and the signal on lead 54, the delta altitude, on lead 60. Lead 60 is presented to conventional Polarity Detector 61. Polarity Detector 61 operates in such a fashion as to output a logical "0" at junction 62 if the mathematical sign of the signal on lead 60 is negative, that is, if the delta altitude signal is less than the predetermined incremental altitude. Conversely, Polarity Detector 61 will output a logical "1" if the signal on lead 60 is positive, that is, if the delta altitude is greater than the predetermined incremental altitude.

When not in the synchronization mode as explained above, Latch 42 receives a signal from Polarity Detector 61 via junction 62 and lead 63. Latch 42 operates in such a fashion as to instantly store the value from junction 41, the current actual altitude of the aircraft, whenever the value on lead 63 is a logical "1"; otherwise, Latch 42 holds the last stored value from when 63 the signal on lead was a logical "1". A similar operation occurs with respect to Latch 80 wherein the value on lead 78 is instantly stored whenever the signal on lead 64 is a logical "1"; otherwise the last stored value is used.

It is convenient at this point to illustrate the operation of the latches by means of example. Assume the aircraft is currently at 11,000 feet of altitude and is descending Latches 42 and 80 will be in the sychronization mode since the output of Polarity Detector 47 will output a logical "1" whenever the actual current altitude is greater than the initialization altitude, 10,000 feet. Consequently, the value on lead 50 will exactly equal the value on lead 49 and the output of summation device 51, appearing at junction 52 will be zero. Lead 60, whose value will be zero minus 100 feet or −100 feet will supply a negative input to Polarity Detector 61. Since the sign of the input is negative, the signal appearing at junction 62 and leads 63 and 64 will be a logical "0". When the aircraft descends below 10,000 feet, Polarity Detector 47 will output a logical "0" thus turning off the synchronization modes of latches 42 and 80 and the latches will hold the instantaneous value appearing at junction 41 and lead 78 respectively. At this point, the output of Polarity Detector 61 will be a logical "0" since the value on lead 54 is less than the value on lead 56, 100 ft. As the aircraft descends to 9899 feet, the signal on lead 54 will be representative of 10,000-9899 or 101 feet. Since 101 feet is greater than the 100 foot value appearing on lead 56, the signal on lead 60 will be positive in sign and thus Polarity Detector 61 will output a logical "1" to junction 62 and leads 63, 64, 109, and 125. As discussed above, a logical "1" output from Polarity Detector 61 results in each latch storing the instantaneous value appearing at its input. Consequently, latch 42 will store a value of 9899 feet while latch 80 will store whatever value appears on lead 78.

Figure 5:
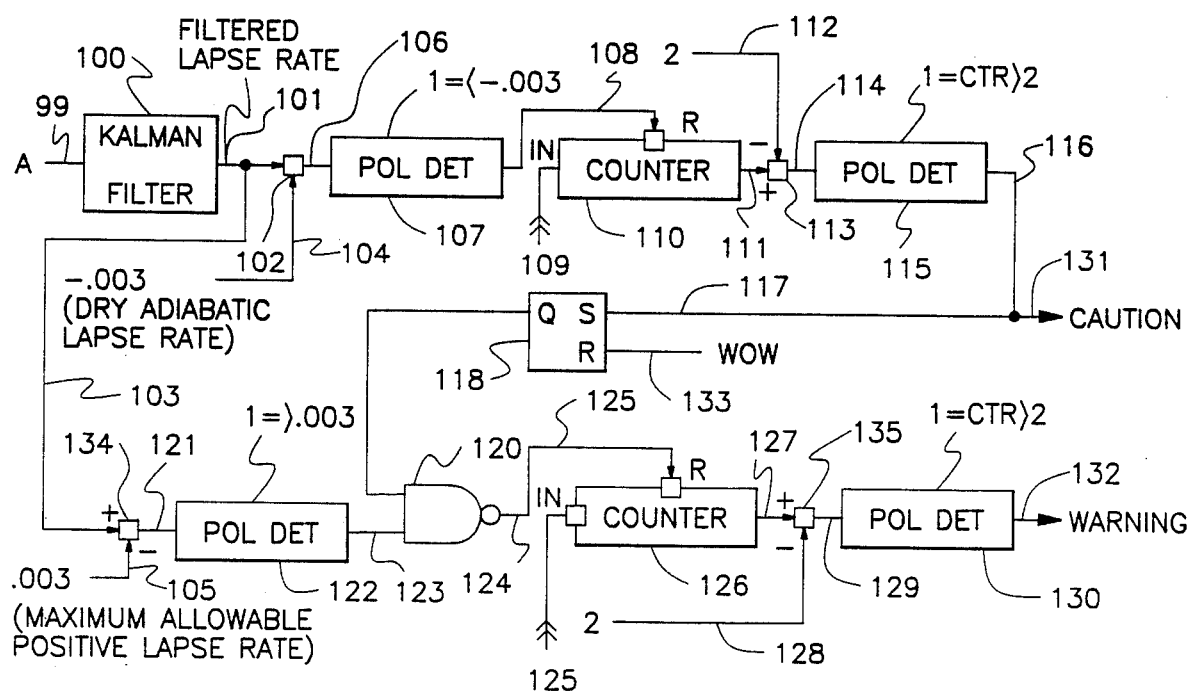

It should be noted that the output of polarity detector 61 functions as a gating signal which provides a change in state or a pulse for each 100 feet incremental change in descending altitude. This gating signal as aforesaid is used to gate each of the latches 42 and 80, and also is used as a signal input to counters 110 and 126 via leads 109 and 125, respectively as illustrated in FIG. 5.

Similarly, the latches 42 and 80 will store their input values at approximately one hundred foot increments as the aircraft descends toward the ground. By this action, it will be appreciated that values to be used in subsequent calculations are based on the values stored at 100 foot increments as the aircraft descends.

Conventional Air Data computer 39 also supplied a signal representing Total Air Temperature (TAT) in degrees Celsius on lead 65. Simultaneously, Air Data Computer 39 also supplied a signal representing the aircraft's Mach number on lead 67, junction 68 and lead 69. It is well known in the art that Static Air Temperature (SAT), or the ambient temperature of the air can be computed from the equation:

$$SAT = \frac{TAT}{(1 + .2 M^2)}$$

Where
SAT=the static air temperature in degrees Celsius
TAT=the total air temperature in degrees Celsius
M=the aircraft's actual Mach number, dimensionless Total air temperature is different from static air temperature due to the rise in temperature from compression of the air due to the aircraft's forward motion.

This equation is solved in the following manner. Total Air Temperature appearing on lead 65 is supplied as the numerator of conventional Divider 66. The signal representative of Mach number on lead 67 is supplied as an input to conventional Multiplier 70 from junction 68 and also lead 69. The output of Multiplier 70 is thus a signal representing Mach number squared and appears on lead 71. Lead 71 is presented as an input conventional gain block 72 which multiplies the value on lead 71 by the constant "0.2". The output of gain block 72 is supplied to conventional summation device 74. Summation device 74 produces the sum of its two inputs from lead 71 and 73 on lead 75 which represents the term $(1+0.2M^2)$. Lead 75 supplies a denominator value to Divider 66. Divider 66 thereby outputs a value, on lead 76, corresponding to Total Air Temperature divided by the term $(1+0.2M^2)$, which from the above equation is seen to be the Static Air Temperature (SAT). A signal representative of SAT appears at junction 77, lead 78 and lead 79. Latch 80 operates in a similar manner to latch 42 and will store the value of SAT as calculated approximately every 100 feet during the aircraft descent. Consequently, the signal appearing on lead 81 represents the stored value of SAT while the signal on lead 79 represents the current value of SAT. Leads 81 and 79 supply conventional summation device 82. Summation device 82 acts in such a manner as to supply the algebraic sum of the signals on leads 81 and 79. Hence, the signal appearing on lead 83 represents a Delta SAT-the difference between the current measured value and the stored value Lead 83 supplies a numerator value to conventional Divider 84.

Lead 53, whose value is the difference between the current actual altitude of the aircraft and the stored value (Delta h), supplied the denominator to Divider 84. Divider 84 outputs therefore a signal representing the quotient of Delta SAT and Delta altitude. The output of divider 84 is therefore a measured value of the desired temperature lapse rate; that is, the change in temperature divided by the change in altitude Lead 85 supplies Reference Terminal A therefore with a signal representing "raw" (that is, unfiltered) temperature lapse rate.

Referring now to FIG. 5, Reference Terminal A supplies the raw or measured temperature lapse rate value to signal filter 100 via lead 99. Filter 100 may be any kind of general noise filter well known to those skilled in the art, but in the preferred embodiment the filter is of the KALMAN type. The essentials of operation will be described.

In the preferred embodiment, the input to the Kalman filter is the raw temperature lapse rate data. In this application, the relevant equation for the filter is:

$$\hat{L}_N = \hat{L}_{N-1} + B*(L_m - \hat{L}_{N-1})$$

Where
$\hat{L}_N$=the output of the filter in deg C. per foot
$\hat{L}_{N-1}$=the last output of the filter before the current calculation in deg C. per foot.
$L_m$=the raw input temperature lapse rate data in deg C. per foot.
B=a coefficient determined by the following equation:

$$B = \frac{S_L}{S_L + S_m}$$

Where $S_L$ is the statistical variance of the raw temperature lapse rate data and $S_m$ is the statistical variance of the measurement error. For example, In one implementation of the preferred embodiment, the value of $S_m$ was determined empirically to be 0.000064.

The statistical variance of the raw temperature lapse rate data is determined by the equation:

$$S_L = (L_m)^2/N - (L_m AVG)^2$$

Where $L_m$ is the raw temperature lapse rate data, N the number of samples taken and $(L_m AVG)^2$ is the square of the arithmetical average of the raw temperature lapse rate data.

The output of Kalman Filter 100 appears on lead 101 and thence to conventional summation device 102. A constant, representing the value of the dry adiabatic temperature lapse rate, −0.003 degrees Celsius per foot appears on lead 104 and thence to summation device 102. Summation device 102 produces the algebraic sum of the values on leads 101 and 104 on lead 106 and to conventional Polarity Detector 107. Polarity Detector 107 acts in such fashion as to output a logical "1" on lead 108 whenever the mathematical sign of the signal on lead 106 is negative; otherwise, the signal on lead 108 is a logical "0". Lead 108 is presented to the Reset input of counter 110 and finishing in a manner as will be subsequently described.

Counter 110 has an input provided by lead 109, the output of polarity detector 61. As indicated earlier, polarity detector 61 provides a change in state at the output thereof for each 100 feet of incremental change in descending altitude. Consequently, counter 110 counts each change in state or pulse cycle corresponding to the 100 feet increments. Counter 110 operates in such a manner as to output a value on lead 111 representing the number of times Polarity Detector 61 has output a logical "1" (e.g., signal leading edge) on lead 109. Therefore, the signal on lead 111 represents the number of 100 foot increments that the temperature lapse rate was less than the dry adiabatic temperature lapse rate.

It should be noted, however, that counter 110 is reset to null whenever the value on lead 108 is a logical "0" through the reset input R. Therefore, counter 110 output is indicative of the count of successive 100 feet increments of descending altitude in which the measured temperature lapse rate is less than the dry adiabatic temperature lapse rate.

The value on lead 111 is supplied to one input of a conventional summation device 113. Simultaneously, a constant value, for example "2", is supplied to summation device 113 via lead 112. Summation device 113 operates in such a fashion as to output the algebraic sum of the signals on leads 111 and 112 on lead 114. Lead 114 supplies the input signal to conventional Polarity Detector 115.

Polarity Detector 115 operates in such a fashion a to output a logical "1" on lead 116 whenever the mathematical sign of the signal on lead 114 is positive; otherwise the signal on lead 116 is a logical "0". Lead 116 is joined with leads 131 and 117. Lead 131 supplies a signal to FIG. 6 to annunciate a cautionary message to the flight crew in a manner yet to be explained. Lead 117 supplies the SET input of conventional flip-flop 118. Consequently, if a logical "1" appears on lead 117, a logical "1" will appear on the output of the flip-flop, labeled Q on the Figure. Simultaneously, a signal from the aircraft's weight-on-wheels sensor (WOW) appears on lead 133 and thence to the RESET input of flip-flop 118. By this action, the output of flip-flop 118 will be null whenever the aircraft has weight-on-wheels, i.e. whenever it is on the ground.

The output of flip-flop 118 appears on lead 119 and is thence supplied to conventional AND logic gate 120 as one input.

Concurrent with the above-described action, the output of the Kalman Filter 100 appears on lead 103 and thence to conventional summation device 134. A constant value, for example +0.003 deg C./foot appears on lead 105 and is thus supplied to summation device 134. Summation device 134 operates in such a manner as to output the algebraic sum of the signals on leads 103 and 105 on lead 121. Lead 121 supplies conventional Polarity Detector 122. Polarity Detector 122 operates in such fashion as to output on lead 123 a logical "1" if the mathematical sign of the signal on lead 121 is positive; otherwise the signal on lead 123 will be a logical "0".

Lead 123 supplies conventional AND logic gate 120 as one input along with lead 119 whose signal is previously described. Conventional AND gate 120 will output a logical "1" on lead 124 if an only if the signals on leads 123 and 119 are both a logical "1"; otherwise, the signal on lead 124 will be a logical "0". Consequently, for the signal on lead 124 to be a logical "1", (i) a CAUTION condition must exist on lead 117, (ii) the aircraft must be in the air, and (iii) a temperature lapse rate greater than +0.003 deg C./foot must have been measured.

The signal on lead 124 is presented to the Reset input of counter 126 and functions in a manner as will be subsequently described.

Counter 126 has an input provided by lead 125, the output of polarity detector 61. As indicated earlier, polarity detector 61 provides a change in state at the output thereof for each 100 feet incremental change in descending altitude. Consequently, counter 126 also counts each change in state or pulse cycle corresponding the 100 feet increments. Counter 126 operates in such a manner as to output a value on lead 127 representing the number of times Polarity Detector 61 has output a logical "1" on lead 125 when both the measured temperature lapse rate was greater than the dry adiabatic temperature lapse rate and the CAUTION condition existed, i.e. flip-flop 118 was set. (Flip-flop 118 being set only when the measured temperature lapse rate was less than the dry adiabatic rate for three successive 100 feet incremental changes in descending altitude. Therefore, the signal on lead 127 represents the number of 100 feet increments that the temperature lapse rate was greater than the dry adiabatic temperature lapse rate.

It should be noted, however, that counter 126 is reset to null whenever the value on lead 124 is a logical "0" through the reset input R. Therefore, counter 126 output is indicative of the count of successive 100 feet increments of descending altitude in which the measured temperature lapse rate is greater than the dry adiabatic temperature lapse rate.

Counter 126 output lead 127 is presented to one input of conventional summation device 135. Simultaneously, a constant value, for example 2, is supplied to summation device 135 via lead 128. Summation device 135 operates such that the output on lead 129 is the algebraic sum of the values on leads 127 and 128.

Lead 129 supplies conventional Polarity Detector 130. Polarity Detector 130 operates in such a fashion that a logical "1" is output on lead 132 if the mathematical sign of the signal on lead 129 is positive; otherwise the signal on lead 132 is a logical "0". A logical "1" on lead 132 is indicative of a WARNING condition of a possible microburst situation.

Figure 6:
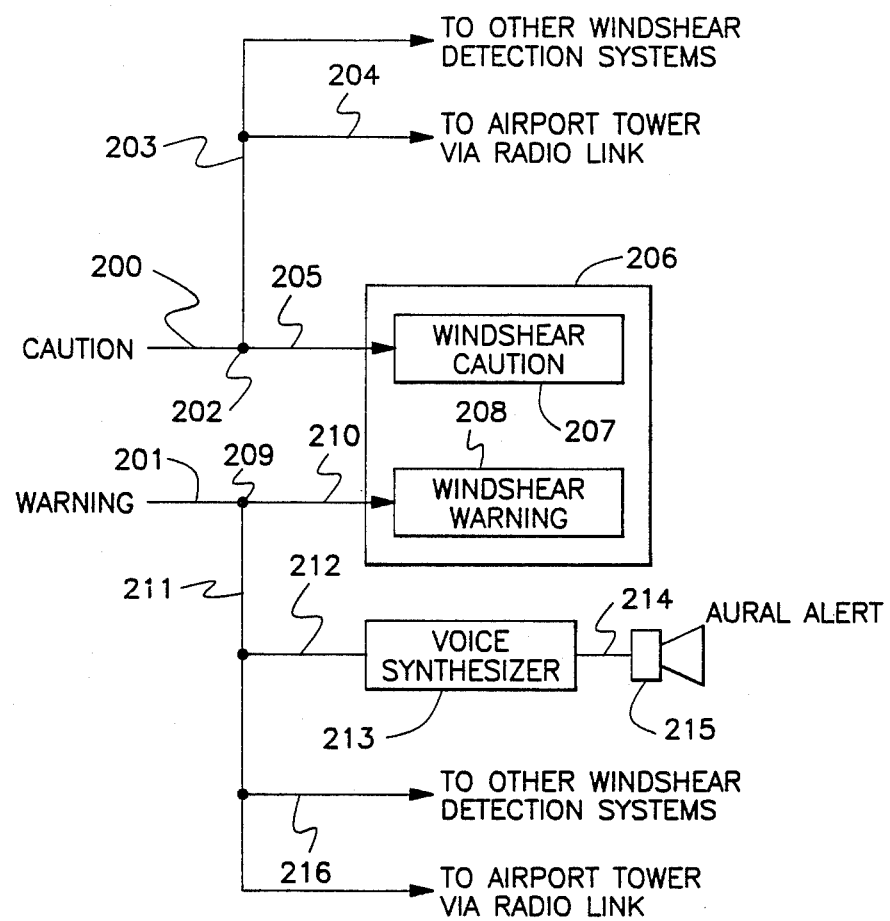

Referring now to FIG. 6, the status of the cautionary condition appears on lead 200 and comes from FIG. 5, i.e. lead 132. A logical "1" on lead 200 is indicative of the possibility of a microburst since a temperature lapse rate less than the dry adiabatic temperature lapse rate has occurred for 3 times as counted by counter 110 of FIG. 5. If the computed temperature lapse rate has been greater than or equal to the dry adiabatic temperature lapse rate, the signal on lead 200 will be a logical "0".

Lead 200 supplies junction 202 and lead 205. Lead 205 supplies a signal to Windshear Light Assembly 206 having an amber light 207 labelled WINDSHEAR CAUTION. Hence, a logical "1" on lead 200 will illuminate the WINDSHEAR CAUTION message to the flight crew of the aircraft. Simultaneously, the signal on lead 200 appears on lead 203 and 204 via junction 202. Lead 203 may be used by other windshear or logic based on the signal on lead 200. One such system that might take advantage of this information is the warning described in the above referred to U.S. Pat. No. 4,593,285.

Lead 201 provides the WARNING logic signal developed from FIG. 5, i.e., lead 132. A WARNING message, as was apparent from the foregoing description, indicates (i) a temperature lapse rate less than −0.003 deg C./foot had been measured at least three consecutive times during the descent, (ii) that the aircraft is in the air, and (iii) that the most recent three measurements have indicated a temperature lapse rate greater than +0.003 deg C./foot. These latter conditions are indicative that the aircraft has flown into the cool outflow air of an existing microburst.

Lead 201 supplies junction 209 and lead 210 supplies a signal to Windshear Light Assembly 206 and red light 208. Light 208 will illuminate if the value on lead 201 is a logical "1", indicating to the flight crew that the aircraft has flown into the cool outflow air of a microburst. Simultaneously, the value on lead 201 is impressed on Voice Synthesizer 213 via junction 209, lead 211 and lead 212. Voice Synthesizer 213 may be any means of generating a human-like voice output including a continuous loop tape recorder, but in the preferred embodiment, it is an electronic chip presently readily available in the marketplace. Voice Synthesizer 213 will output a voltage whose magnitude and frequency will produce a human-voice sounding like the words "WINDSHEAR WINDSHEAR WINDSHEAR" via lead 214 and conventional audio speaker 215. Such a scheme will readily attract the flight crew's attention and alert them to possible danger.

Lead 211, which has the value on lead 201 via junction 209, may supply an onboard radio link with the airport terminal in the manner well known to those skilled in the art. Such information could be used to advise other aircraft not equipped with the present invention of potential microburst conditions.

Lead 216, which has the value on lead 201 via junction 209 and lead 211, may be used by other on-board windshear detection systems in the manner described above for the cautionary message.

From the foregoing, it will be appreciated that the present invention provides the following features:

(1) The temperature lapse rate is calculated at approximately every 100 feet as the aircraft descends below a predetermined initialization altitude.

(2) The calculated temperature lapse rate is filtered to remove unwanted noise.

(3) The filtered temperature lapse rate is compared to the dry adiabatic temperature lapse rate and if three consecutive occurrences wherein the filtered temperature laps rate is less than the dry adiabatic temperature lapse rate, a CAUTION message is generated.

(4) If a CAUTION message has been generated and subsequent filtered temperature lapse rates are above a predetermined value for three consecutive occurrences, a WARNING message is generated, indicating that the aircraft has flown into a microburst.

(5) Both the CAUTION and WARNING messages may be used to illuminate lights in the cockpit to alert the flight crew, used to modify the sensitivity and logic of other on-board windshear detection systems to provide a higher reliability of annunciation, and used by on-board radio link with the airport terminal to warn other aircraft in the area about possible microburst conditions.

While the invention has been described in its preferred embodiments, it is to be understood that the words which have been used are words of description rather than limitation and that changes may be made within the purview of the appended claims without departing from the true scope and spirit of the invention in its broader aspects.

It should be further recognized that the particular values selected for incremental descending altitude values, as well as the comparison temperature lapse rates are only exemplary in nature. Variations in these parameter are to be understood to be within the true spirit and scope of the present invention. Lastly, it should be clearly understood that the implementation of the invention as presented is only exemplary in nature in order to provide a clear understanding of the present invention. As should be recognized by those skilled in the art, the block diagram illustrated in FIGS. 4, 5, and 6 may be implemented by a combination of software contained in a computer and hardware.

I claim:

1. A wind shear detection apparatus for an aircraft comprising:

aircraft sensing means for providing output signals indicative of the altitude, total air temperature, and the air speed of said aircraft;

means responsive to said altitude signal for providing a gating signal for each occurrence of a selected descent altitude increment of the altitude of said aircraft;

means responsive to said gating signal, said total air temperature signal, and said air speed signal for providing an output signal representative of the empirical temperature lapse rate during each of said descending increments;

means for counting successive gating signals corresponding to said descent altitude increments when said empirical temperature lapse rate is less than a first selected temperature lapse rate, and providing a first signal indicative of a count thereof in excess of a first selected count value;

means for counting successive gating signals corresponding to said descent altitude increments when said empirical temperature lapse rate is greater than a second selected temperature lapse rate, and providing a second signal indicative of a count thereof in excess of a second selected count value;

means responsive to said first and second signals for providing a third output signal representative of the condition that during descent of said aircraft (i) said empirical temperature lapse rate was less than said first selected temperature lapse rate followed by (ii) said empirical temperature lapse rate being greater than said second selected temperature lapse rate; and said first selected temperature lapse rate being selected such that said first signal indication represents an unstable atmospheric condition, and said second selected temperature lapse rate being selected such that said third output signal indication represents a high probability that said aircraft is experiencing a microburst atmospheric condition.

2. The apparatus of claim 1 wherein said first selected temperature lapse rate is the dry adiabatic temperature lapse rate, and said second selected temperature lapse rate is a positive temperature lapse rate.

3. The apparatus of claim 1 wherein said first selected temperature lapse rate is the dry adiabatic temperature lapse rate, and said second selected temperature lapse rate is a positive temperature lapse rate, and said third output signal is operative to provide a visual or audible warning signal indicative of said atmospheric conditions being indicative of a hazardous microburst windshear condition.

* * * * *